United States Patent
Baek et al.

(10) Patent No.: US 12,530,327 B2
(45) Date of Patent: Jan. 20, 2026

(54) APPARATUS AND METHOD FOR VALIDATING VARIOUS KINDS OF DATA AND DIGITAL TWIN OPERATION

(71) Applicant: ELECTRONICS AND TELECOMMUNICATIONS RESEARCH INSTITUTE, Daejeon (KR)

(72) Inventors: Myung-Sun Baek, Daejeon (KR); Young Soo Park, Daejeon (KR); Yong Tae Lee, Daejeon (KR); Eui Suk Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/457,878

(22) Filed: Aug. 29, 2023

(65) Prior Publication Data

US 2024/0078218 A1  Mar. 7, 2024

(30) Foreign Application Priority Data

Sep. 5, 2022 (KR) .......................... 10-2022-0112311

(51) Int. Cl.
*G06F 16/215* (2019.01)
(52) U.S. Cl.
CPC ................................. *G06F 16/215* (2019.01)
(58) Field of Classification Search
CPC ..................................................... G06F 16/215
USPC ........................................................ 707/692
See application file for complete search history.

(56) References Cited

U.S. PATENT DOCUMENTS

| 2014/0279399 | A1* | 9/2014 | Shidler ................. G06Q 40/03 705/38 |
| 2015/0088557 | A1* | 3/2015 | Huynh ................. G06Q 10/10 705/4 |
| 2015/0294045 | A1 | 10/2015 | Jeon et al. |
| 2017/0310685 | A1* | 10/2017 | Zhao ................. G06Q 20/3224 |
| 2020/0133732 | A1* | 4/2020 | Kondiles .............. G06F 9/5027 |
| 2021/0370129 | A1 | 12/2021 | Yang et al. |
| 2022/0198562 | A1* | 6/2022 | Cella ...................... G06Q 40/04 |
| 2023/0367794 | A1* | 11/2023 | Treynor ................ G06F 16/288 |

FOREIGN PATENT DOCUMENTS

| KR | 20210061669 A | 5/2021 |
| KR | 20220011461 A | 1/2022 |
| KR | 10-2383144 B1 | 4/2022 |
| KR | 10-2022-0076198 A | 6/2022 |
| KR | 20220072225 A | 6/2022 |
| KR | 20220101192 A | 7/2022 |

\* cited by examiner

*Primary Examiner* — Amy Ng
*Assistant Examiner* — Antonio J Caiado
(74) *Attorney, Agent, or Firm* — Rabin & Berdo, P.C.

(57) ABSTRACT

The apparatus for validating various kinds of data and a digital twin operation includes a validation target data selector configured to select a target to be validated among various kinds of input data, a data validator configured to validate individual data for each type of data selected for validation, and a data linkage validator configured to validate various kinds of multiple data by linking the various kinds of multiple data in order to detect an error in a process of linking the various kinds of multiple data.

9 Claims, 9 Drawing Sheets

FIG. 2

$$\begin{cases} \text{TEMPERATURE IN JANUARY} \\ -10°C \leq x(t) < 10°C, \text{NORMAL} \\ 10°C \leq x(t) < 20°C, \text{CAUTION} \\ 20°C \leq x(t) < 30°C, \text{RISK} \end{cases}$$

APPARATUS AND METHOD FOR VALIDATING VARIOUS KINDS OF DATA AND DIGITAL TWIN OPERATION

CROSS-REFERENCE TO RELATED APPLICATION

This application claims priority to and the benefit of Korean Patent Application No. 10-2022-0112311, Sep. 5, 2022, the disclosure of which is incorporated herein by reference in its entirety.

BACKGROUND

1. Field

The present invention relates to an apparatus and method for validating various kinds of data and a digital twin operation.

2. Description of Related Art

A digital twin is a technology developed to solve or optimize real world problems by digitally replicating real world objects (people, things, and spaces) and performing various simulation experiments through the digitally replicated objects.

In various kinds of digital twin linkage systems, when output data of individual digital twins is data that is invalid or includes errors, there is a problem in that an output value linked with the corresponding data also becomes invalid.

SUMMARY

The present invention provides an apparatus and method for validating individual input data and whether there is an abnormality sign, and validating a linked output value, in a system that receives various kinds of data and derives a desired output value by linking the data.

The present invention relates to an apparatus and method for validating various kinds of data and a digital twin operation.

According to an embodiment of the present invention, an apparatus for validating various kinds of data and a digital twin operation includes: a validation target data selector configured to select a target to be validated among various kinds of input data; a data validator configured to validate individual data for each type of data selected for validation; and a data linkage validator configured to validate various kinds of multiple data by linking the various kinds of multiple data in order to detect an error in a process of linking the various kinds of multiple data.

The data validator may validate the individual data by comparing a preset validation reference value and current data according to the data type.

When it is determined that there is a data error, the data validator may determine whether an invalid value of the data is due to noise or an abnormality sign.

When it is determined that the invalid value of the data is due to the noise based on whether the invalid value of the data exceeds a noise determination reference interval or returns to a normal value, the data validator may extract an invalid data part and an occurrence time of the corresponding part to generate side information.

The data validator may replace a noise generating part with a correction value using the side information, and revalidate data validity.

When it is determined that the invalid value of the data is due to the abnormality sign based on whether the invalid value of the data exceeds a noise determination reference interval or returns to a normal value, the data validator may detect an invalid data start part to generate the side information, and display an abnormality sign generation value and a comparison result with a normal category.

The data linkage validator may determine a priority of the individual data and validate the various kinds of data by linking the various kinds of data.

When a data error is discovered according to data linkage validation, the data linkage validator may determine whether the invalid value of the data is due to noise or an abnormality sign based on whether the invalid value of the data exceeds a noise determination reference interval or returns to a normal value.

When it is determined that the invalid value of the data is due to the noise, the data linkage validator may replace a noise generating part with a correction value and revalidate data validity.

When it is determined that an invalid value of the data is due to the abnormality sign, the data linkage validator may detect an invalid data start part to generate side information, and display an abnormality sign generation value and a comparison result with a normal category.

The apparatus may further include a linkage block integration validator configured to receive a validation result of the data linkage validator to check a data error and an abnormality sign, check side information related to validity of each data, and finally reviews whether there are invalid data and an abnormality sign.

According to another embodiment of the present invention, a method of validating various kinds of data and a digital twin operation includes: (a) selecting a target that requires validation for input data used in the digital twin; (b) validating individual data for each type of data selected in the step (a); and (c) performing validation by linking various kinds of multiple data with the selected data.

In the step (b), the validation of the individual data may be performed using a preset range according to a data type.

In the step (b), when it is determined that there is an error in validation result data, an occurrence cause of an invalid value of the data may be determined based on whether the invalid value of the data exceeds a noise determination reference interval or returns to a normal value.

In the step (b), when it is determined that the occurrence cause of the invalid value of the data is due to simple noise, side information may be generated by extracting an invalid data part and an occurrence time of the corresponding part, and the invalid data part may be replaced with a correction value using the side information, and then, data validity may be revalidated.

In the step (b), when it is determined that the occurrence cause of the invalid value of the data is due to an abnormality sign, abnormality sign generation value information and comparison result information with a normal category may be displayed together.

In the step (c), a priority of the individual data may be determined, validity may be validated by linking the various kinds of data, and it may be determined that an invalid value of the data is due to noise or an abnormality sign based on whether the invalid value of the data exceeds a noise determination reference interval or returns to a normal value.

In the step (c), when it is determined that the invalid value of the data is due to the noise, a noise generating part may be replaced with a correction value and data validity may be revalidated.

In the step (c), when it is determined that the invalid value of the data is due to the abnormality sign, an invalid data start part may be detected to generate side information, and an abnormality sign generation value and a comparison result with a normal category may be displayed.

The method may further include (d) in the step (c), performing linkage block integration validity using a data linkage validation result to check a data error and an abnormality sign, check side information related to the validity of each data, and finally reviewing whether there are invalid data and an abnormality sign.

BRIEF DESCRIPTION OF DRAWINGS

FIG. 2 is a diagram illustrating an example of validating data according to an embodiment of the present invention.

DETAILED DESCRIPTION

Figure 1:
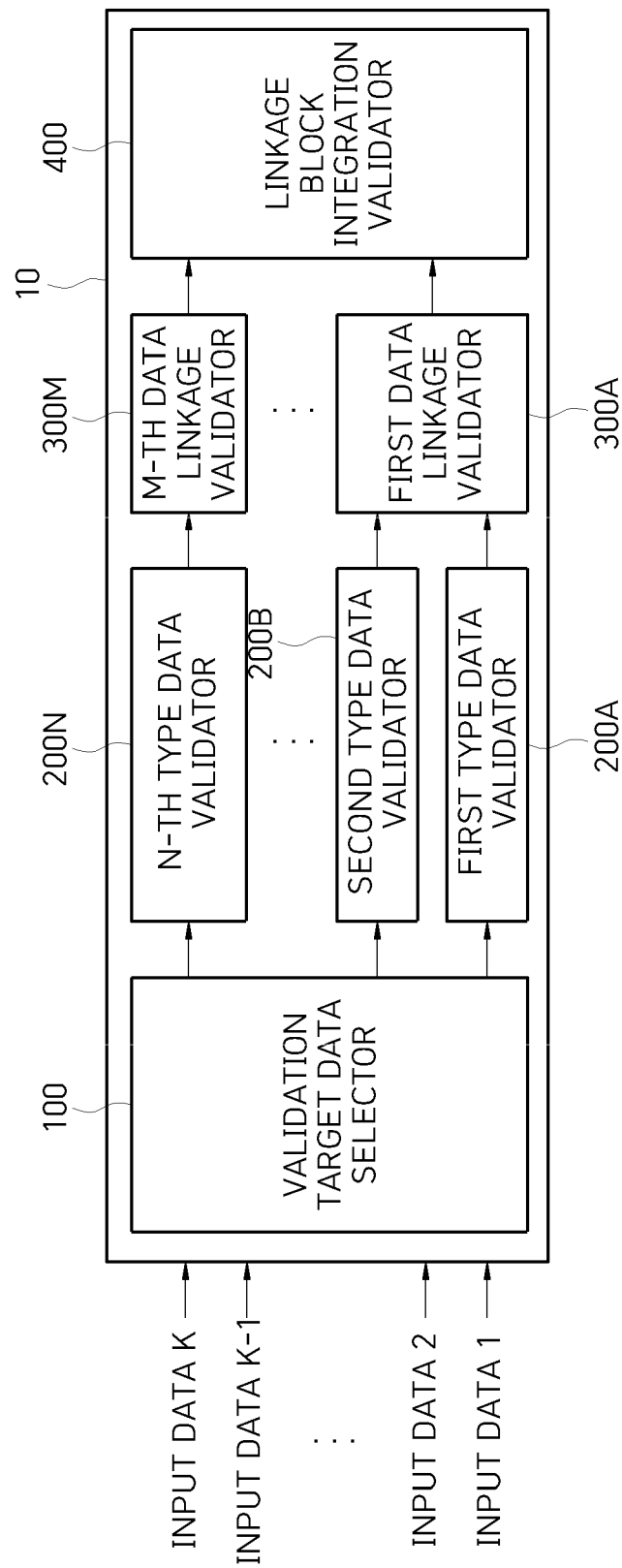
FIG. 1 is a diagram illustrating an apparatus for validating various kinds of data and a digital twin operation according to an embodiment of the present invention.

The above-mentioned aspect, and other aspects, advantages, and features of the present disclosure and methods accomplishing them will become apparent from the following detailed description of exemplary embodiments with reference to the accompanying drawings.

However, the present invention may be modified in many different forms and it should not be limited to the exemplary embodiments set forth herein, and only the following embodiments are provided to easily inform those of ordinary skill in the art to which the present invention pertains the objects, configurations, and effects of the present invention, and the scope of the present invention is defined by the description of the claims.

Meanwhile, terms used in the present specification are for explaining exemplary embodiments rather than limiting the present invention. Unless otherwise stated, a singular form includes a plural form in the present specification. "Comprises" and/or "comprising" used in the present invention indicate(s) the presence of stated components, steps, operations, and/or elements but do(es) not exclude the presence or addition of one or more other components, steps, operations, and/or elements.

The concept of a digital twin continues to evolve, and is mainly developed and utilized for optimization of industrial processes or equipment in the manufacturing sector, and is increasingly being applied to public services such as river management and port management at the government level.

It is necessary to build a large-scale digital twin to build a digital twin at the city or country level, or to solve complex problems and optimize systems. However, when building a large-scale digital twin, the complexity of implementation and management increases exponentially as the number of objects, the number of target models included, and the like greatly increases. Therefore, it is possible to realize a huge federated digital twin by linking various kinds of single digital twins. In a system linking various kinds of digital twins, when output data of individual digital twins is data that is invalid or includes errors, an output value associated with the corresponding data may also be invalid. Therefore, it is necessary to validate various kinds of data and to validate output values linked with various kinds of data.

In a system that links, configures, and manages multiple digital twins (single digital twin) targeting a single system or single process, it is possible to use output data of various kinds of digital twins as input. A technique for validating the output data of these various kinds of digital twins and validating the output value linked with the data is required. That is, in a system that uses various kinds of data as input and outputs desired data by linking the input data, validity of various kinds of input data should be validated and an abnormality sign of individual data should be identified, and rationality and validity of the output values linked with various kinds of data should also be validated.

The present invention is proposed for validation and management of various kinds of data, and proposes a technique for validating various kinds of individual data and output values linked with various kinds of data, and identifying abnormality signs.

The digital twin is a technology convergence platform that solves complex problems and creates a new industry/service ecosystem by replicating and reproducing the real world into the digital world. More specifically, the digital twin is a convergence technology for synchronizing physical objects and digital objects that mimic the physical objects in time and space, analyzing situations for various purposes, and optimizing the physical objects by performing prediction based on simulation results. Therefore, by using the digital twin, it is possible to overcome limitations of time, cost, space, and information to solve problems in the real world.

To date, the digital twin has been in the form of a single digital twin. The single digital twin is a form of building and operating a digital twin targeting a single system or single process. A river digital twin predicting river flooding, a manufacturing digital twin predicting productivity of a jet engine manufacturing plant, and the like correspond to a single twin.

In order to build the single twin, multiple objects or variables required by the corresponding target system should be considered as inputs. In the case of rivers, rainfall, snowfall, current velocity, quantity, and the like may be considered as input variables, and in engine manufacturing, a plurality of raw parts, manufacturing equipment, manufacturing processes, and the like may be considered as input variables. In addition, the output may be the river flooding in the case of the river twin, the production time required for one manufactured jet engine in the case of the manufacturing digital twin, or the productivity for a certain period of time. Such a digital twin model is expressed as [Equation 1] below.

$$T_1 = f_1(X_1) \qquad \text{[Equation 1]}$$

In [Equation 1], $f_1$ denotes a function representing the built single digital twin process, and $T_1$ denotes output data through the single digital twin process. The input data X1 is a column matrix of input variables composed of a plurality of data combination-based variables and may be expressed as in [Equation 2].

$$X_1 = [x_1(1), x_1(2), \ldots, x_1(L)] \quad \text{[Equation 2]}$$

In [Equation 2], L denotes the number of input variables.

According to an embodiment of the present invention, in order to implement a large-scale physical system as a digital twin, a federated digital twin in which multiple single digital twins are federated is proposed. It is possible to build a federated digital twin by identifying multiple single digital twins in the federated digital twin management platform and selecting single digital twins according to the operational purpose of the federated digital twin.

The optimization of the large-scale system is performed by operating the federated digital twin, and when necessary, not only the single digital twin but also individual objects in the physical world are generated as digital objects, and are added to the single digital twin or configure the federated digital twin through individual management.

The federated digital twin system implemented through K single digital twins and N individual objects may be expressed as [Equation 3] below.

$$T_F = F(f_1(x_1), f_2(x_2), f_3(x_3), \ldots, f_k(x_k), \ldots, f_K(x_K),$$
$$o_1, o_2, \ldots o_n, \ldots, o_N) \quad \text{[Equation 3]}$$

In [Equation 3], F(·) denotes a function that generates a federated digital twin service by linking the federated single digital twins, and $T_F$ denotes the output data of the federated digital twins. $f_k(X_k)$ is a k-th single digital twin process function, and the output data of the function is $T_k$. $O_n$ is an n-th individual object added for the federated digital twin. In [Equation 3], the individual object refers to a single object rather than digital twin data, and may correspond to individual objects such as fine dust concentration and humidity at a specific location and traffic light information at a specific location over time.

As described above, when desired output data is generated by linking various kinds of data, validation procedures for various kinds of input data that are sources of output data generation are necessarily required. This is because, when the output data is generated by utilizing input data including errors, reliability of the data is not guaranteed, which may lead to errors in the entire system.

FIG. 1 is a diagram illustrating an apparatus 10 for validating various kinds of data and a digital twin operation according to an embodiment of the present invention.

Referring to FIG. 1, K data are received as an input of validation. A validation target data selector 100 selects data that is determined to require validation among input data, and transmits the selected data to data validators (illustrated as 200A to 200N). The data validators are divided into each type, for example, N data among K input data are selected as validation targets (K≥N).

The data validators classified for each type validate individual data and transmit the validation result to data linkage validators (illustrated as 300A to 300M). The data validator validates the validity using the validity determination criteria for each data, and the validity determination criterion is set to a numerical value or the like represented by each data. For example, as defined in [Equation 4], data within a first range may be set as normal, data within a second range may be set as caution, and data within a third range may be set as danger.

$$\begin{cases} \delta_0 \leq x(t) < \delta_1, & \text{normal} \\ \delta_1 \leq x(t) < \delta_2, & \text{caution} \\ \delta_2 \leq x(t) < \delta_3, & \text{risk} \end{cases} \quad \text{[Equation 4]}$$

In [Equation 4], x(t) is a numerical value at time t or a t-th numerical value of data, and δ is a reference value of a range representing normal/caution/danger.

FIG. 2 illustrates an example of data validity according to an embodiment of the present invention, and illustrates an example (temperature data in January) in which [Equation 4] described above may be actually used.

When the validity of the individual data is validated through the above process, the data linkage validator validates validity by linking a plurality of data. Even after the validation for each individual data is completed, errors may be included in the process of linkage processing of multiple data, so data linkage validation is performed to detect these errors.

After validating the validity by linking the plurality of data, a linkage block integration validator 400 finally performs integrated validation by linking all the data.

Figure 3:
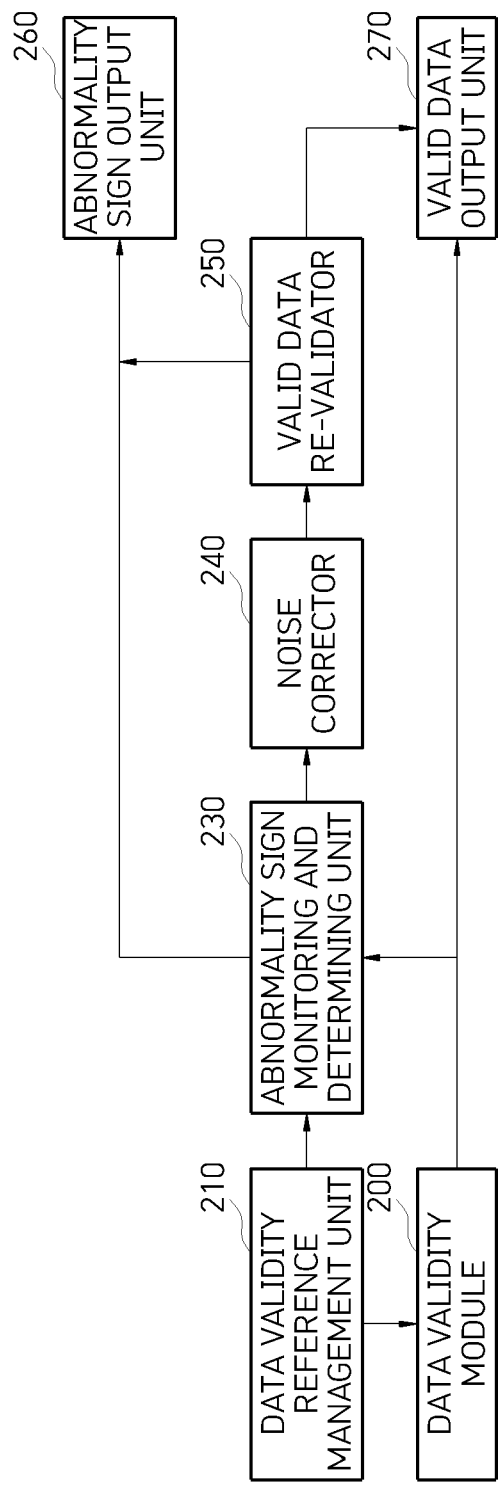
FIG. 3 is a diagram illustrating a data validator according to an embodiment of the present invention.
Figure 4:
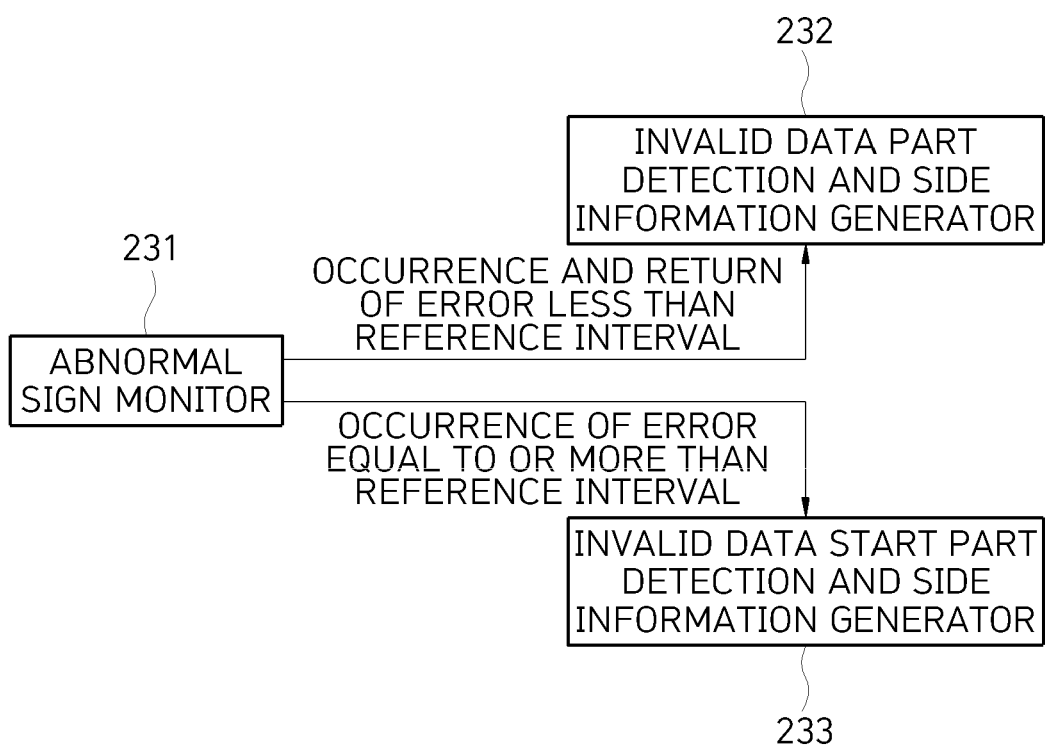
FIG. 4 is a diagram illustrating an abnormality sign monitoring and determining unit according to an embodiment of the present invention.

FIG. 3 illustrates a data validator according to an embodiment of the present invention, and FIG. 4 illustrates an abnormality sign monitoring and determining unit according to an embodiment of the present invention.

As described above, the data validator performs data validity using the validation criteria stored in a validation reference management unit 210 for each data type.

A data validity module 220 compares a current value of data with the validation reference value according to the data type to validate the validity. The data validity module 220 transmits data to the valid data output unit 270 when it is determined that the data has no error as a validation result. However, when it is determined that there is an error in the data, the data validity module 220 transmits the data to the abnormality sign monitoring and determining unit 230.

An abnormality sign monitor 231 first determines whether an invalid value of data is an error due to simple noise or an error based on a reason such as failure or malfunction of an object data collection sensor.

The abnormality sign monitor 231 determines that an error is caused by noise when an invalid value of data occurs for a very short time less than the noise determination reference interval and then returns to a normal value. The noise determination reference interval may be set differently according to the data type. When it is determined as noise, an invalid data part detection and side information generator 232 extracts an invalid data part and an occurrence time of the corresponding part to generate side information.

When the invalid value of the data continues to exceed the noise determination reference interval, the abnormality sign monitor 231 determines that the invalid value of the data is not due to simple noise but is due to an abnormality sign. The invalid data start part detection and side information generator 233 extracts a start time of invalid data and generates side information.

When it is determined that the invalid value of the data is due to noise, the corresponding data is transmitted to a noise corrector 240. The noise corrector 240 extracts pre/post-data of the invalid data part based on side information received from the invalid data part detection and side information generator 232, and replaces a noise generating part with a corrected value through noise correction based on statistical characteristics, noise correction based on machine learning such as a recurrent neural network (RNN), or the like. The noise corrector 240 is optional and can be applied as needed, and is not applied to a system in which noise correction or deletion is unnecessary. When the noise corrector 240 is applied to correct noise, a valid data re-validator 250 validates the data validity once again to determine whether the invalid data due to the noise has been properly corrected, and determines whether the invalid data is transmitted to the valid data output unit 270 according to whether the invalid data has been properly corrected.

When it is determined that the invalid value of the data is due to the abnormality sign, the abnormality sign monitoring and determining unit 230 transmits the data to the abnormality sign output unit 260, and the abnormality sign output unit 260 displays the abnormality sign. The abnormality sign output unit 260 displays a value where the abnormality sign occurs and a comparison result with a normal category together, and thus, supports an administrator to more accurately determine whether there is the abnormality sign.

Figure 5:
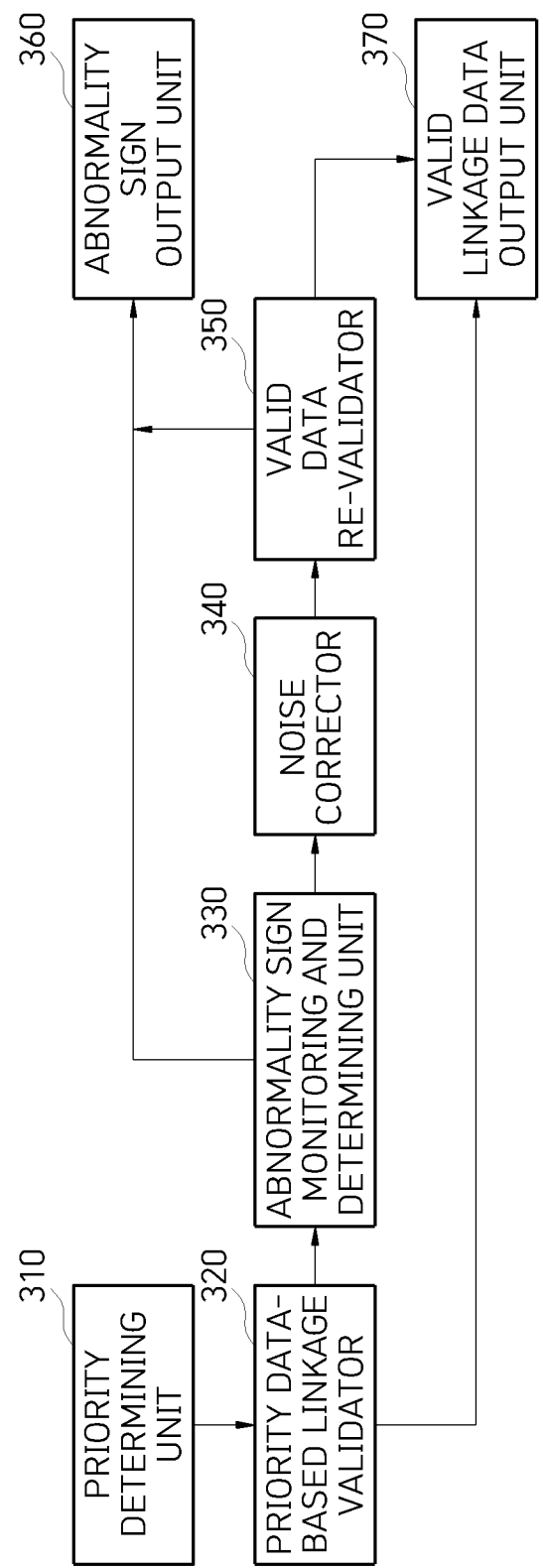
FIG. 5 is a diagram illustrating illustrates a data linkage validator according to an embodiment of the present invention.

FIG. 5 is a diagram illustrating illustrates a data linkage validator according to an embodiment of the present invention.

The data linkage validator according to an embodiment of the present invention validates validity by linking various kinds of data. A priority determining unit 310 determines priority of data, assigns a higher priority to environmental and condition data and the like, and assigns a lower priority to operation data and the like.

For example, weather data is high-priority data, and high priority is assigned to environmental and condition data, such as whether there is precipitation and whether temperature is high or low.

For example, tourist destination floating population data is subordinated motion data, and when weather data of 20° C. without rain is selected as a priority condition and tourist destination floating population data is applied as a lower priority, a high value of floating population is generally obtained.

A priority data-based linkage validator 320 validates data by linking a plurality of data, and a decision tree method or the like is used for the validation.

As a result of the validation of the priority data-based linkage validator 320, when it is determined that there is no error in data, the data is transmitted to a valid linkage data output unit 370, and when it is determined that there is an error in data, the priority data-based linkage validator 320 transmits the corresponding data to the abnormality sign monitoring and determining unit 330.

The abnormality sign monitoring and determining unit 330 determines whether the result of data validity validated by linking multiple data is due to simple noise or an error based on a reason such as a failure or malfunction of an object data collection sensor.

When it is determined that the result of the data validity is due to the simple noise, the noise corrector 340 extracts the pre/post-data of the invalid data part, and replaces the noise generating part with the corrected value through noise correction based on statistical characteristics or noise correction based on machine learning such as a recurrent neural network (RNN).

When the noise corrector 340 is applied to correct noise, a valid data re-validator 350 validates the data validity once again to determine whether the invalid data due to the noise has been properly corrected, and determines whether the invalid data is transmitted to the valid linkage data output unit 370 according to whether the invalid data has been properly corrected.

When it is determined that the invalid value of the data is the abnormality sign, the abnormality sign monitoring and determining unit 330 transmits the corresponding data to the abnormality sign output unit 360, and the abnormality sign output unit 360 displays the value where the abnormality sign occurs and the comparison result with the normal category, and thus, supports the administrator to accurately identify whether there is the abnormality sign.

The linkage block integration validator 400 checks data errors and abnormality signs once again, checks the validity side information of each data, and finally monitors the decision tree values once again, thereby finally reviewing whether there are the invalid data, the abnormality signs, and the like.

Figure 6:
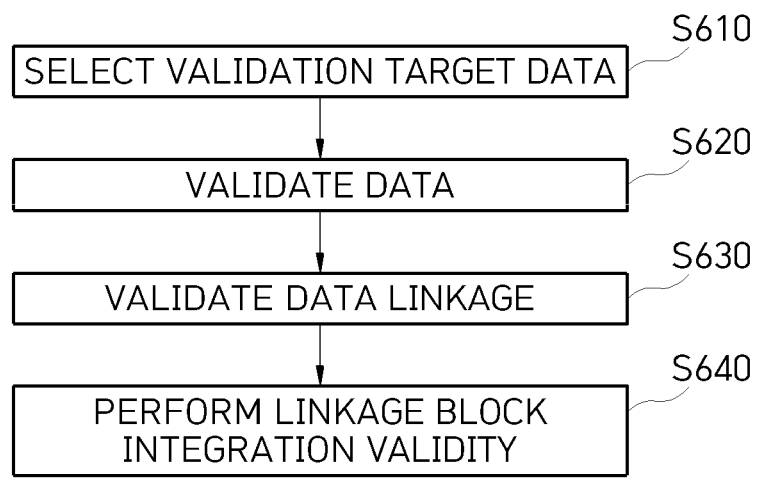
FIG. 6 is a diagram illustrating a method of validating various kinds of data and a digital twin operation according to an embodiment of the present invention.

FIG. 6 is a diagram illustrating a method of validating various kinds of data and a digital twin operation according to an embodiment of the present invention.

In step S610, data to be validated is selected from among input data. In step S620, data validity is validated for each data type. In step S630, validation is performed by linking various kinds of data using data validity results validated for each type. In step S640, linkage block integration validation is finally performed.

Figure 7:
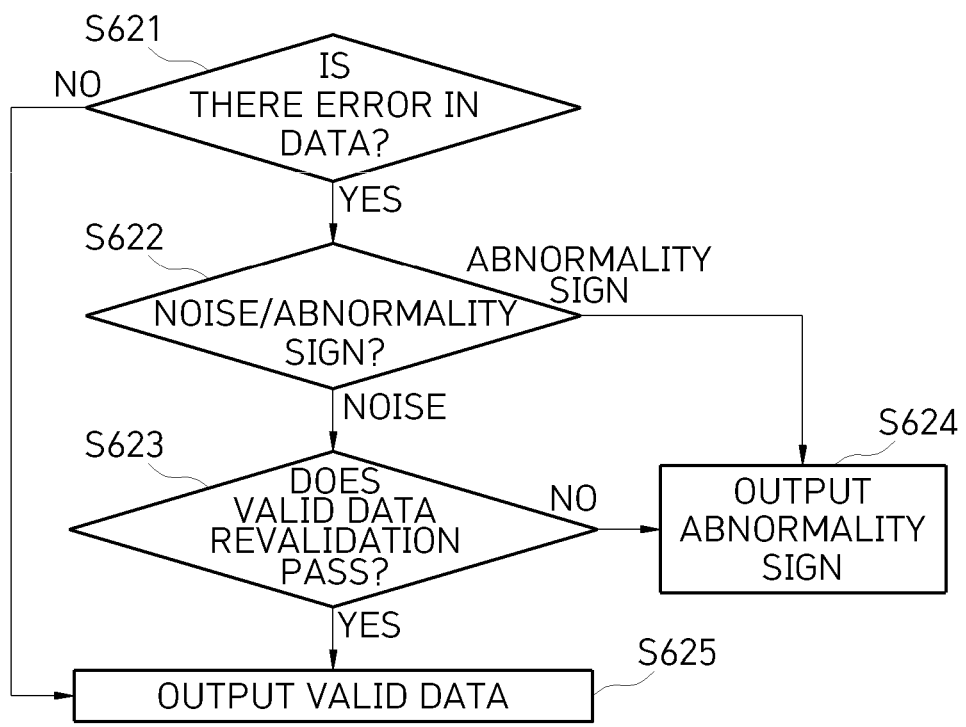
FIG. 7 is a diagram illustrating a process of validating data according to an embodiment of the present invention.

FIG. 7 is a diagram illustrating a process of validating data according to an embodiment of the present invention.

In step S621, validity is validated by comparing a current value of data and a validation reference value according to the data type, and it is checked whether there is an error in the data.

When it is determined that there is no error in the data in step S621, in step S625, valid data is output.

When it is determined that there is an error in the data in step S621, in step S622, it is determined whether the corresponding error is due to simple noise or an abnormality sign.

In step S622, when the invalid value of the data continues to exceed the noise determination reference interval, it is determined that the invalid value of the data is not due to the simple noise but is due to the abnormality sign. In this case, the side information is generated by extracting the time when the invalid data starts, and in step S624, the abnormality sign is output.

In step S622, when the invalid value of the data occurs for a very short time equal to less than the noise discrimination reference interval and then returns to the normal value, it is determined that the error is due to noise. In this case, the side information is generated based on the invalid data part and the occurrence time of the corresponding part.

In step S623, the noise correction is performed, and whether it is checked that the valid data revalidation passes according to a noise correction result. That is, the data validity is validated once again to determine whether the invalid data due to the noise has been properly corrected, and when it is determined that the invalid data has been properly corrected, in step S625, the valid data is output.

Figure 8:
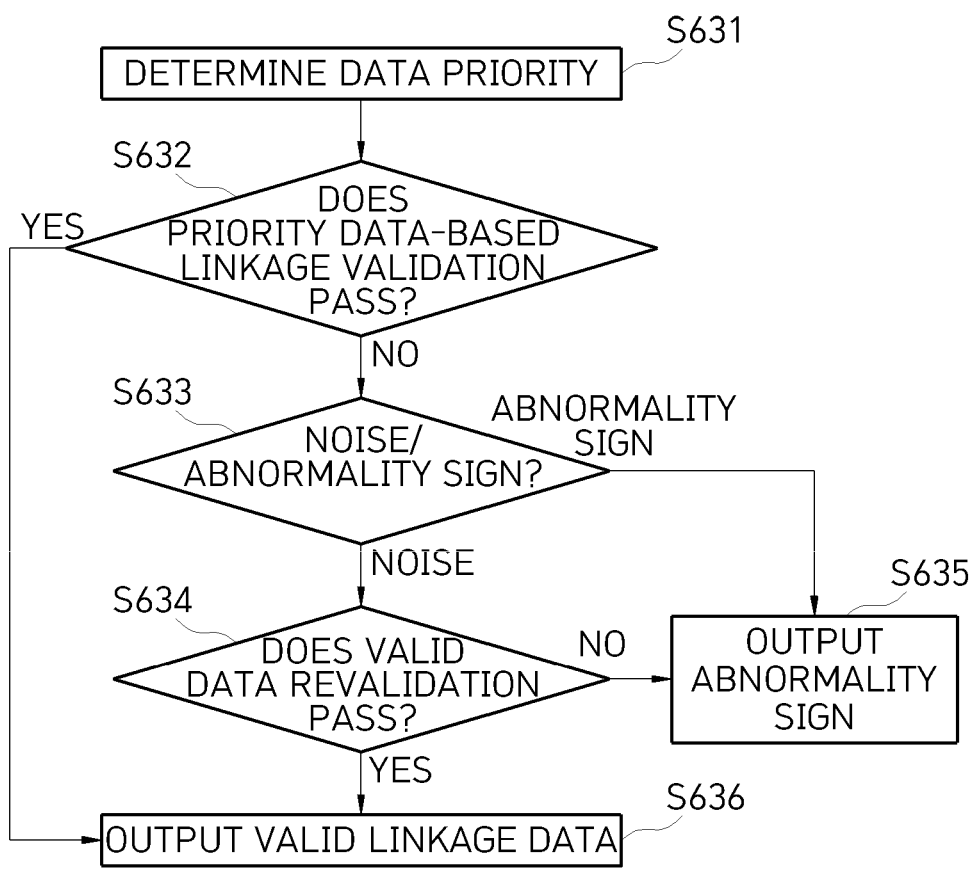
FIG. 8 illustrates a data linkage validation process according to an embodiment of the present invention.

FIG. 8 illustrates a data linkage validation process according to an embodiment of the present invention.

In step S631, the priority of data is determined. A higher priority is assigned to environmental and condition data, and the like, and lower priority is assigned to operation data.

In step S632, it is checked whether the linked data is valid based on the priority data.

When it is checked in step S632 that the validation passes, in step S636, linkage valid data is output.

When it is determined in step S632 that the validation does not pass, that is, when it is determined that there is an error in the data, in step S633, it is determined whether the corresponding error is due to the simple noise or corresponds to the abnormality sign.

In step S633, when the invalid value of the data continues to exceed the noise discrimination reference interval, it is determined that the invalid value of the data is not due to the simple noise but the abnormality sign and generates the side information by extracting the time when the invalid data starts, and in step S635, the abnormality sign is output.

In step S633, when the invalid value of the data occurs for a very short time equal to less than the noise discrimination reference interval and then returns to the normal value, it is determined that the error is due to the noise. In this case, the side information is generated based on the invalid data part and the occurrence time of the corresponding part.

In step S634, the noise correction is performed, and whether it is checked that the valid data revalidation passes according to the noise correction result. That is, the data validity is validated once again to determine whether the invalid data due to the noise has been properly corrected, and when it is determined that the invalid data has been properly corrected, in step S636, the valid data is output.

According to the present invention, it is possible to prevent data-based errors from occurring in a system that receives various kinds of data and derives a desired output value by linking the corresponding data.

The effects of the present invention are not limited to those mentioned above, and other effects not mentioned can be clearly understood by those skilled in the art from the following description.

Figure 9:
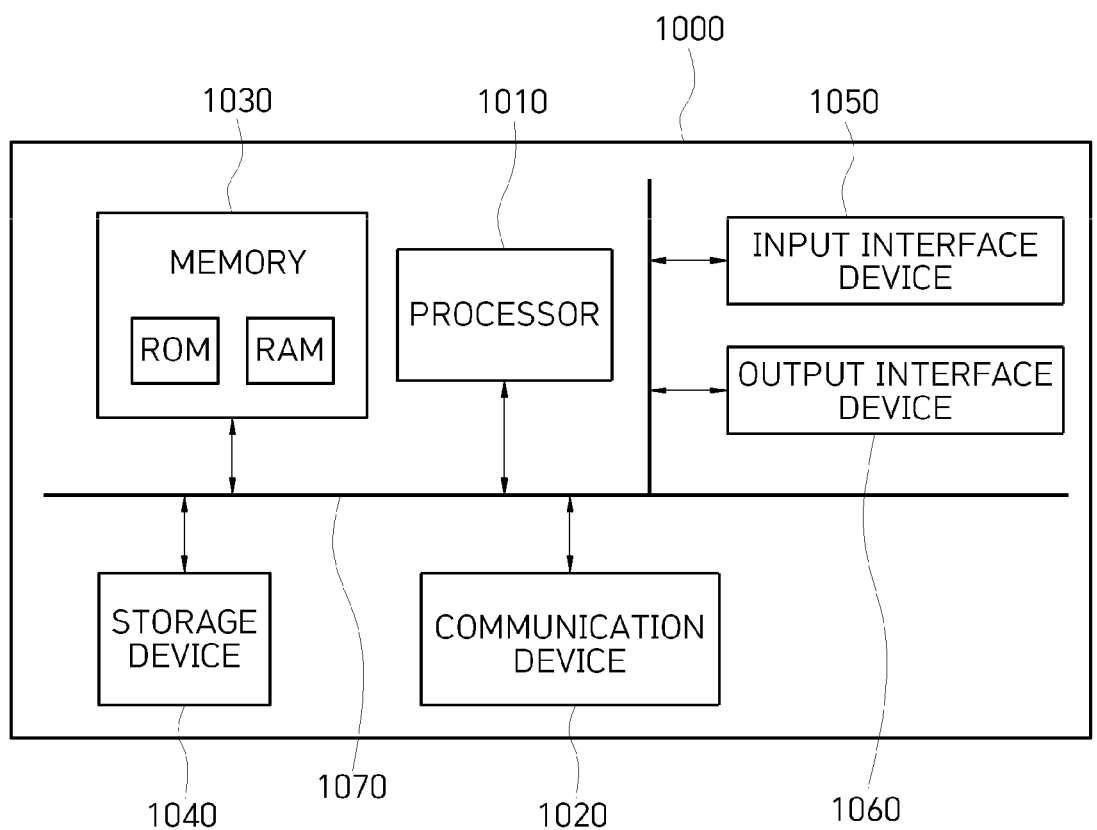
FIG. 9 is a block diagram illustrating a computer system for implementing the method according to the embodiment of the present invention.

FIG. 9 is a block diagram illustrating a computer system for implementing the method according to the embodiment of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for validating various kinds of data and a digital twin operation, comprising:
   a validation target data selector configured to select a target to be validated among various kinds of input data;
   a plurality of data validators configured to validate individual data for each of data types selected for validation, respectively; and
   a data linkage validator configured to validate various kinds of multiple data provided by the plurality of data validators;
   wherein the various kinds of multiple data include data output by a plurality of linked federated single digital twins, the federated single digital twins corresponding respectively to different industrial processes or public services or a combination of the different industrial processes and public services, and the various kinds of multiple data correspond to operations by the federated single digital twins to synchronize physical objects and digital objects that mimic the physical objects in time and space, analyze situations for various purposes, and optimize the physical objects by performing prediction based on simulation results;
   wherein when a data error is discovered according to data linkage validation, the data linkage validator determines whether an invalid value of the data is due to noise or an abnormality sign based on whether the invalid value of the data exceeds a noise determination reference interval or returns to a normal value;
   wherein when it is determined that the invalid value of the data is due to the noise, the data linkage validator replaces a noise generating part with a correction value and revalidates data validity;
   wherein the correction value is obtained through noise correction based on at least one of statistical characteristics, or on machine learning by a recurrent neural network (RNN);
   wherein each of the plurality of data validators validates the individual data by comparing preset validation reference values within a range and a numerical value of current data according to data type, and classifies the numerical value of the current data based on the range;
   wherein after validation for each of the individual data is completed, the data linkage validator validates the various kinds of multiple data by detecting errors due to a process of linking the multiple data; and
   wherein when it is determined that the invalid value of the data is due to the abnormality sign based on whether the invalid value of the data exceeds the noise determination reference interval or returns to the normal value, the data validator detects an invalid data start part to generate side information, and displays an abnormality sign generation value and a comparison result with a normal category.

2. The apparatus of claim 1, wherein the data linkage validator determines a priority of the individual data and validates the various kinds of data by linking the various kinds of data.

3. The apparatus of claim 1, wherein when it is determined that an invalid value of the data is due to the abnormality sign, the data linkage validator detects the invalid data start part to generate the side information, and displays the abnormality sign generation value and the comparison result with the normal category.

4. The apparatus of claim 1, further comprising a linkage block integration validator configured to receive a validation result of the data linkage validator to check a data error and the abnormality sign, check side information related to validity of each data, and finally reviews whether there are invalid data and the abnormality sign.

5. A method of validating various kinds of data and a digital twin operation, comprising:
   (a) selecting a target that requires validation for input data used in digital twins;
   (b) by a plurality of data validators, validating individual data for each of data types selected in the step (a), respectively; and
   (c) performing validation by linking various kinds of multiple data provided by the plurality of data validators;
   wherein the various kinds of multiple data include data output by a plurality of linked federated single digital twins, the federated single digital twins corresponding respectively to different industrial processes or public services or a combination of the different industrial processes and public services, and the various kinds of multiple data correspond to operations by the federated single digital twins to synchronize physical objects and digital objects that mimic the physical objects in time and space, analyze situations for various purposes, and optimize the physical objects by performing prediction based on simulation results;
   wherein in the step (c), a priority of the individual data is determined, validity is validated by linking the various kinds of multiple data, and it is determined that an invalid value of the data is due to noise or an abnormality sign based on whether the invalid value of the data exceeds a noise determination reference interval or returns to a normal value;
   wherein in the step (c), when it is determined that the invalid value of the data is due to the noise, a noise generating part is replaced with a correction value and data validity is revalidated;
   wherein the correction value is obtained through noise correction based on at least one of statistical characteristics, or on machine learning by a recurrent neural network (RNN);
   wherein each of the plurality of data validators validates the individual data by comparing preset validation reference values within a range and a numerical value of current data according to data type, and classifies the numerical value of the current data based on the range; and wherein after validation for each of the individual data is completed, the data linkage validator validates the various kinds of multiple data by detecting errors due to a process of linking the multiple data; and
   wherein further in the step (c), when it is determined that the invalid value of the data is due to the abnormality sign based on whether the invalid value of the data exceeds the noise determination reference interval or returns to the normal value, an invalid data start part is detected to generate side information, and an abnormality sign generation value and a comparison result with a normal category is displayed.

6. The method of claim 5, wherein in the step (b), when it is determined that an occurrence cause of the invalid value of the data is due to simple noise, the side information is generated by extracting an invalid data part and an occurrence time of a corresponding part, and the invalid data part is replaced with a correction value using the side information, and then, data validity is revalidated.

7. The method of claim 5, wherein in the step (b), when it is determined that an occurrence cause of the invalid value of the data is due to the abnormality sign, abnormality sign generation value information and comparison result information with the normal category are displayed together.

8. The method of claim 5, wherein in the step (c), when it is determined that the invalid value of the data is due to the abnormality sign, the invalid data start part is detected to generate the side information, and the abnormality sign generation value and the comparison result with the normal category are displayed.

9. The method of claim 5, further comprising (d) in the step (c), performing linkage block integration validity using a data linkage validation result to check a data error and the abnormality sign, checking side information related to validity of each data, and finally reviewing whether there are invalid data and the abnormality sign.

* * * * *